US012633855B2

(12) United States Patent
Zhang et al.

(10) Patent No.: US 12,633,855 B2
(45) Date of Patent: May 19, 2026

(54) METHOD AND SYSTEM OF ADAPTIVE CURRENT CONTROL FOR AC SERVO MOTOR

(71) Applicant: TIANJIN SAIXIANG TECHNOLOGY CO., LTD, Tianjin (CN)

(72) Inventors: Xiaochen Zhang, Tianjin (CN); Qiping Chu, Tianjin (CN); Jianhao Zhang, Tianjin (CN)

(73) Assignee: TIANJIN SAIXIANG TECHNOLOGY CO., LTD, Tianjin (CN)

( * ) Notice: Subject to any disclaimer, the term of this patent is extended or adjusted under 35 U.S.C. 154(b) by 162 days.

(21) Appl. No.: 18/292,713

(22) PCT Filed: Jul. 28, 2021

(86) PCT No.: PCT/CN2021/108876
§ 371 (c)(1),
(2) Date: Jan. 26, 2024

(87) PCT Pub. No.: WO2023/004618
PCT Pub. Date: Feb. 2, 2023

(65) Prior Publication Data
US 2024/0372495 A1     Nov. 7, 2024

(51) Int. Cl.
*H02P 21/22* (2016.01)
*H02P 21/14* (2016.01)
*H02P 25/022* (2016.01)

(52) U.S. Cl.
CPC .............. *H02P 21/22* (2016.02); *H02P 21/14* (2013.01); *H02P 25/022* (2013.01)

(58) Field of Classification Search
CPC ......... H02P 21/14; H02P 21/22; H02P 25/022
See application file for complete search history.

(56) References Cited

U.S. PATENT DOCUMENTS 7,852,039 B2 * 12/2010 Kinpara .................. H02P 27/06
                                                      318/807
9,419,555 B2 * 8/2016 Matsuura ................ H02P 21/06
(Continued)

FOREIGN PATENT DOCUMENTS

CN         103532465 A      1/2014
CN         104767458 A  *  7/2015
(Continued)

*Primary Examiner* — Thai T Dinh
(74) *Attorney, Agent, or Firm* — MUNCY, GEISSLER, OLDS & LOWE, P.C.

(57) ABSTRACT

A method of adaptive current control for an alternating-current AC servo motor includes acquiring an initial three-phase AC motor current; inputting the initial three-phase AC motor current to a current vector transformation module to generate first target data; inputting the first target data to a current control loop, and simultaneously taking time derivative of the first target data to generate second target data; and inputting both of the second target data and an output of the current control loop to an incremental dynamic inversion control module, and inputting an output of the incremental dynamic inversion control module to the current vector inverse transformation module. The method eliminates a need of motor model with the controller parameters being tuned, thereby overcoming the technical problems in conventional technologies that motor model identification, particularly online model identification, significantly increases system complexity.

5 Claims, 2 Drawing Sheets acquire an initial current input the initial current to a current vector transformation module to generate first target data input the first target data to a current control loop, and meanwhile taking time derivative of the first target data to generate second target data input both of the second target data and an output of the current control loop to an incremental dynamic inversion control module, and input an output of the incremental dynamic inversion control module to the current vector

(56)        References Cited

U.S. PATENT DOCUMENTS

|  |  |  |  |  |
|---|---|---|---|---|
| 9,621,092 | B2 * | 4/2017 | Oono | .................... H02P 21/141 |
| 10,199,971 | B2 * | 2/2019 | Yamazaki | ............... H02P 21/00 |
| 10,784,803 | B2 * | 9/2020 | Eguchi | ................... H02P 27/12 |
| 2010/0134064 | A1 | 6/2010 | Heikkila | |
| 2011/0204831 | A1 * | 8/2011 | Iwaji | ....................... H02P 21/04 |
|  |  |  |  | 318/244 |
| 2019/0393817 | A1 * | 12/2019 | Eguchi | ................... H02P 21/22 |

FOREIGN PATENT DOCUMENTS

|  |  |  |  |  |  |
|---|---|---|---|---|---|
| CN | 110138297 | A | | 8/2019 | |
| CN | 111404433 | A | | 7/2020 | |
| CN | 112087177 | A | * 12/2020 | ............. H02P 21/24 |
| JP | 2020096425 | A | * 6/2020 | ............. H02P 27/08 |

* cited by examiner

METHOD AND SYSTEM OF ADAPTIVE CURRENT CONTROL FOR AC SERVO MOTOR

FIELD

The present invention relates to motor control, and more particularly relates to a method and system of adaptive current control for an AC servo motor.

BACKGROUND

As smart technologies advance, smart devices have been increasingly applied in people's life, work, and study. Smart techniques improve life quality and enhance study and work efficiency. In the field of motor control, since a motor system is essentially a non-linear, time-variant, and uncertain system, its control system needs to be designed with a non-linear adaptive control algorithm.

At present, the motors generally adopt a traditional PID control algorithm for their servo control systems. The PID control algorithm is a linear system-based control algorithm. A problem arising in controlling a non-linear servo motor with the PID algorithm is how to tune PID (Proportional, Integral and Differential) parameters. Due to the nonlinearity, time-variance, and uncertainty of the motor system, offline or online identification of a nonlinear model or a linear model of the motor is necessary. The identified motor model is used for real-time or segmental tuning of PID parameters. For the traditional PID algorithm, their parameters are constant throughout the control process. However, in practical applications, the overall controlled system is unpredictable, so that invariant PID parameters cannot render an optimal system control effect. Although a considerable control accuracy can be achieved, the model identification, particularly online model identification, significantly increases system complexity; in addition, the model identification cannot always guarantee correctness of the resultant model and model parameters, so that such a control system can hardly be certified. Likewise, other adaptive or smart algorithms, such as fuzzy control, sliding mode control, neural network-based control, model reference adaptive control, also cannot guarantee algorithm stability or stable operation under any operating load interference environment.

By far, no effective solution has yet been provided to the problems noted.

SUMMARY

Embodiments of the present disclosure provide a method and a system of adaptive current control for an AC servo motor, so as to at least solve technical problems in conventional technologies that motor model identification, particularly online model identification, significantly increases system complexity; the model identification cannot always guarantee correct model and model parameters obtained; and the fuzzy control, sliding mode control, neural network-based control, and model reference adaptation cannot guarantee algorithm stability and stable operation under any operating load interference environment.

In one aspect of the disclosure, there is provided a method of adaptive current control for an alternating-current AC servo motor, comprising:

A method of adaptive current control for an alternating-current AC servo motor, comprising:

acquiring an initial current;

inputting the initial current to a current vector transformation module to generate first target data;

inputting the first target data to a current control loop, and simultaneously taking time derivative of the first target data to generate second target data; and inputting both of the second target data and an output of the current control loop to an incremental dynamic inversion control module, and inputting an output of the incremental dynamic inversion control module to the current vector inverse transformation module.

Furthermore, the initial current is an initial three-phase AC motor current.

Furthermore, the incremental dynamic inversion control module is expressed as:

$$\Delta u_d = (u_d - u_{d0}) = L_d\left(v_d - \frac{di_d}{dt}\big|_0\right)$$

$$\Delta u_q = (u_q - u_{q0}) = L_q\left(v_q - \frac{di_q}{dt}\big|_0\right)$$

where $\Delta u_d$ and $\Delta u_q$ are d-axis control increment and q-axis control increment, $v_d$ and $v_q$ are virtual control variables in dynamic inversion control, $$\frac{di_d}{dt}\big|_0 \quad \text{and} \quad \frac{di_q}{dt}\big|_0$$

are time derivatives of currents $i_d$ and $i_q$ at a sampling point, $u_d$ and $u_q$ are current sample values of d-axis and q-axis control outputs, $u_{d0}$, $u_{q0}$ are sample values preceding the d-axis and q-axis control outputs, respectively, $L_d$ denotes d-axis inductance, and $L_q$ is q-axis inductance.

Furthermore, control of the AC servo motor further comprises: rotating speed control loop and rotating angle-position control loop.

In a second aspect of the disclosure, there is provided a system of adaptive current control for an alternating-current AC servo motor, comprising:

a sampling module configured to acquire an initial current;

a current vector transformation module configured such that the initial current is inputted to the current vector transformation module to generate first target data;

a current control module configured to input the first target data to a current control loop and simultaneously take time derivative of the first target data to generate second target data; and an incremental dynamic inversion module configured to input both of the second target data and an output of the current control loop to an incremental dynamic inversion control module, and input an output of the incremental dynamic inversion control module to the current vector inverse transformation module.

The disclosure further discloses a non-volatile storage medium, the non-volatile storage medium comprising a program stored, wherein the program, when running, controls a device where the non-volatile storage medium is hosted to perform the method according to the first aspect.

Furthermore, the disclosure further discloses an electronic device, comprising a processor and a memory, the memory storing a computer-readable instruction, the processor being configured to execute the computer-readable instruction, wherein the computer-readable instruction, when being executed, performs the method according to the first aspect.

According to a further aspect of the embodiments of the disclosure, there is further provided a non-volatile storage medium, the non-volatile storage medium comprising a program stored, wherein the program, when running, controls a device where the non-volatile storage medium is hosted to perform the method according the first aspect.

According to a still further aspect of the embodiments of the disclosure, there is further provided an electronic device, comprising a processor and a memory; the memory storing a computer-readable instruction, the processor being configured to execute the computer-readable instruction, wherein the computer-readable instruction, when being executed, performs the method according to the first aspect.

In the embodiments of the disclosure, time derivative of current is used instead of a motor system model, which eliminates a need of system model in dynamic inversion control, thereby overcoming the technical problems in conventional technologies that motor model identification, particularly online model identification, significantly increases system complexity: the model identification cannot always guarantee correct model and model parameters obtained; and the fuzzy control, sliding mode control, neural network-based control, and model reference adaptation cannot guarantee algorithm stability and stable operation under any operating load interference environment.

BRIEF DESCRIPTION OF THE DRAWINGS

The drawings illustrated herein are intended to provide further understanding of the disclosure and constitute an integral part of the disclosure: schematic examples and their illustrations provided herein only serve for explaining the disclosure, not constituting improper limitations to the disclosure. In the drawings.

DETAILED DESCRIPTION OF EMBODIMENTS

To facilitate those skilled in the art to better understand the subject matter disclosed herein, the technical solutions in the example embodiments of the disclosure will be described clearly and comprehensively with reference to the accompanying drawings. It is apparent that the example embodiments described herein are only part of the embodiments of the disclosure, not all of them. All other embodiments obtained by those skilled in the art based on the example embodiments described herein without exercise of inventive work shall all fall within the protection scope of the disclosure.

It is noted that, the terms like "first," and "second" referred to in the specification, claims, and drawings are used for distinguishing like objects, not necessarily used for describing a specific sequence or priority. It should be understood that features termed with such numerals may be replaced with each other in appropriate circumstances, such that the example embodiments of the disclosure described herein can be implemented in a sequence not illustrated or described here. In addition, the terms "comprise" and "have," as well as any of their variants, intent for a non-exclusive inclusion, e.g., a process, method, system, product, or apparatus comprising a series of steps or units are not necessarily limited to those steps or units explicitly limited herein, but may further comprise other steps or units not explicitly limited herein or inherent to such a process, method, system, product or apparatus.

According to the embodiments of the disclosure, there is provided an example method for adaptive current control for an AC servo motor. It is noted that, the steps illustrated in the flow diagrams in the accompanying drawings may be executed for example in a computer system with a set of computer-executable instructions: in addition, although a logic sequence is illustrated in the flow diagram, in some cases, the illustrated or described steps may be executed in a sequence different from what is described herein.

Figure 1:
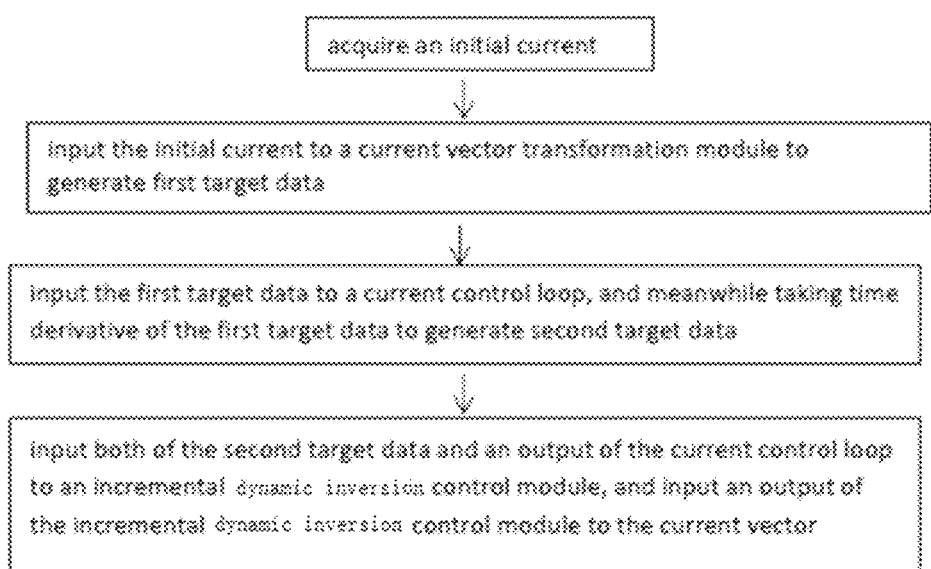
FIG. 1 is a flow diagram of a method of adaptive current control for an alternating-current AC servo motor according to some example embodiments of the disclosure.

FIG. 1 is a flow diagram of a method of adaptive current control for an AC servo motor according to some example embodiments of the disclosure. As illustrated in FIG. 1, the method comprises steps below:

Step S100, in which an initial current is acquired; the current is a three-phase AC motor current.

Step S200, in which the initial three-phase AC motor current is inputted to a current vector transformation module to generate first target data;

Step S300, in which the first target data is inputted to a current control loop, and simultaneously a time derivative of the first target data is taken to generate second target data; and Step S400, in which the second target data and an output of the current control loop are both inputted to an incremental dynamic inversion control module, and an output of the incremental dynamic inversion control module is inputted to a current vector inverse transformation module.

Figure 2:
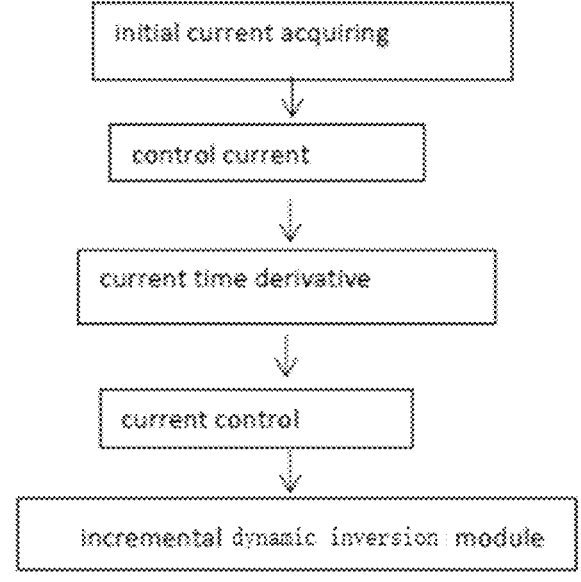
FIG. 2 is a structural block diagram of a method of adaptive current control for an alternating-current AC servo motor according to some example embodiments of the disclosure.

FIG. 2 is a structural block diagram of a system of adaptive current control for an AC servo motor according to some example embodiments of the disclosure. As illustrated in FIG. 2, the system comprises:

an initial current acquiring module configured to acquire an initial three-phase AC motor current;

a control current module configured to input the initial three-phase AC motor current to a current vector transformation module to generate first target data;

a current time derivative module configured to take time derivative of the first target data to generate second target data; and a current control module, wherein an error between the first target data and desired first target data is inputted to the current control module;

specifically, the current control module has proportional, integral, and differential functions.

An incremental dynamic inversion module is configured to input both of the second target data and an output of the current control module to an incremental dynamic inversion control module, an output of the incremental dynamic inversion control module being inputted to a current vector inverse transformation module.

Or, the system comprises:

a sampling module configured to acquire an initial current;

a current vector transformation module configured such that the initial current is inputted to the current vector transformation module to generate first target data;

a current control module configured to input the first
target data to the current control loop and simultane-
ously take time derivative of the first target data to
generate second target data; and an incremental dynamic inversion module configured to
input both of the second target data and an output of the
current control loop to an incremental dynamic inver-
sion control module, and input an output of the incre-
mental dynamic inversion control module to the current
vector inverse transformation module.

Figure 3:
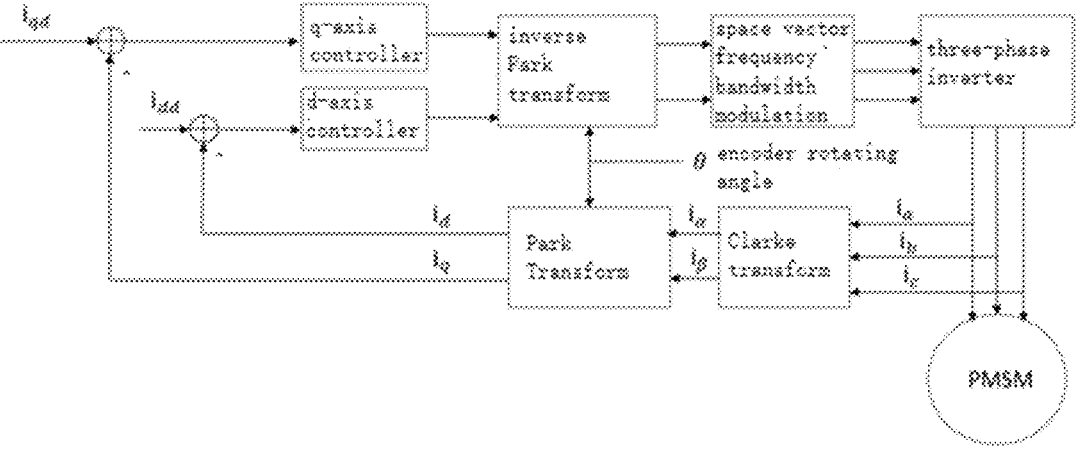
FIG. 3 is a block diagram illustrating an existing current control principle for an AC servo motor.

The current vector transformation module and the current
vector inverse transformation module serve to transform AC
current control as easily as DC current control based on the
current vector control theory: the AC current is firstly
transformed to DC current (by the current vector transfor-
mation module) and implement control in a DC current
environment; then, the DC current is transformed to the AC
current (by the current vector inverse transformation mod-
ule) to control the AC motor, as illustrated in FIG. 3. The
current vector transformation module includes Clark Trans-
form and Park Transform, as illustrated in FIG. 3. The
current vector inverse transformation module includes
Inverse Park Transform, space vector pulse width modula-
tion, and Inverse Clarke Transform (i.e., a three-phase
inverter), as illustrated in FIG. 3.

The incremental dynamic inversion control module is
given below:

$$\Delta u_d = (u_d - u_{d0}) = L_d \left( v_d - \frac{di_d}{dt} \big|_0 \right)$$

$$\Delta u_q = (u_q - u_{q0}) = L_q \left( v_q - \frac{di_q}{dt} \big|_0 \right)$$

where $\Delta u_d$ and $\Delta u_q$ denote d-axis and q-axis control
increments; $v_d$ and $v_q$ denote virtual control variables in
dynamic inversion control;

$$\frac{di_d}{dt} \big|_0 \quad \text{and} \quad \frac{di_q}{dt} \big|_0$$

denote time derivatives of currents $i_d$ and $i_q$ at a sampling
point; in this equation, $u_d$ and $u_q$ denote current sample
values of d-axis and q-axis control outputs, $u_{d0}$, $u_{q0}$ denote
sampling values preceding the d-axis and q-axis control
outputs respectively; $L_d$ denotes d-axis inductance; and $L_q$
denotes q-axis inductance.

Figure 4:
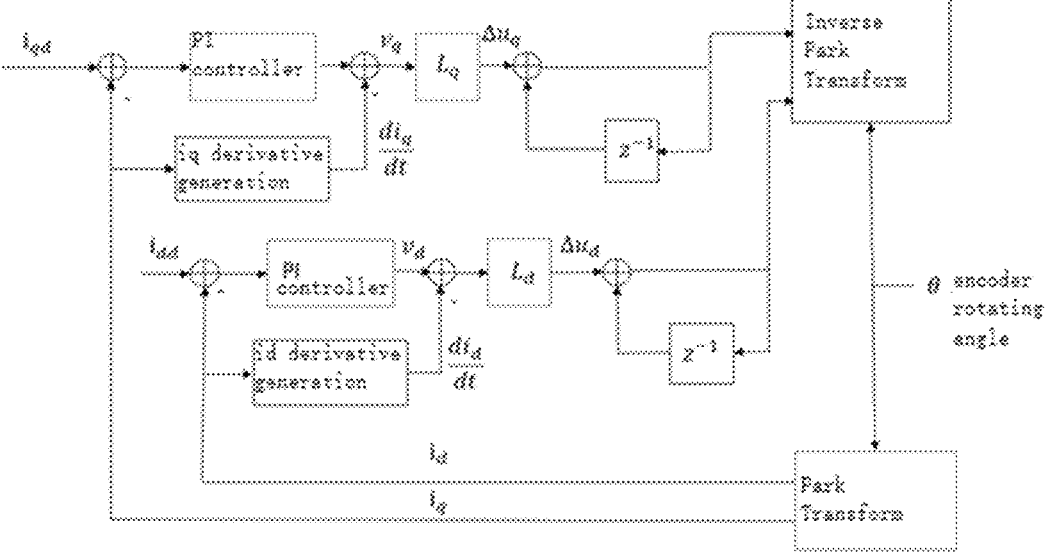
FIG. 4 is a block diagram illustrating an adaptive current vector control principle according to some example embodiments of the disclosure.

Specifically, as illustrated in FIG. 4, which is a block
diagram illustrating an adaptive current vector control prin-
ciple according to some example embodiments of the dis-
closure, the mathematic models in the example system of
adaptive current control for an AC servo motor as noted
supra include: a current model, a speed model, and a position
model, which may be given as follows:

Current Model $$\frac{di_d}{dt} = \frac{1}{L_d}(u_d - Ri_d + p\omega_m L_q i_q) \tag{1}$$

$$\frac{di_q}{dt} = \frac{1}{L_q}(u_q - Ri_q + p\omega_m L_d i_d - p\omega_m \psi_m) \tag{2}$$

Speed Model

-continued $$\frac{d\omega_m}{dt} = \frac{1}{J}\{pi_q[\psi_m - (L_q - L_d)i_d] - B\omega_m - T_L\} \tag{3}$$

Position Model $$\frac{d\theta}{dt} = \omega_m \tag{4}$$

The variables and parameters in equations (1) to (4) above
are defined as such: $i_d$, and $i_q$ denote d-axis current and
q-axis current: $L_d$ denotes d-axis inductance: $L_q$ denotes
q-axis inductance: $\omega_m$ denotes angular speed of the rotor: p
denotes the number of magnetic poles, $T_L$ denotes the
unknown load torque input: B denotes the unknown resis-
tance coefficient: J denotes rotational inertia: R denotes
unknown equivalent resistance: $\theta$ denotes rotary angle of
motor rotor: $\Psi_m$ denotes permanent magnet flux: $u_d$ and $u_q$
denote d-axis control input and q-axis control input, respec-
tively.

It is noted that, a permanent-magnet synchronous motor
(shortly PMSM) refers to a synchronous motor with its rotor
using permanent magnet instead of winding. PMSM may be
classified into three types: axial flux, radial flux, and trans-
verse flux. Dependent on layout of the components thereof,
different types of PSMSs are different in terms of efficiency,
size, weight, and operating speed. The operating principle of
PSMS is the same as the electrically excited synchronous
motor, except that the PSMS uses the flux provided by the
permanent magnet instead of the latter's field winding
excitation, so that the motor structure is simplified. The
PMSM is a synchronous motor with a synchronous rotating
magnetic field produced by permanent magnet excitation,
where the permanent magnet serves as the rotor to produce
the rotating magnetic field, and a three-phase stator winding
induces three-phase symmetrical current via armature reac-
tion under the action of the rotating magnetic field. Now; the
kinetic energy of the rotor is converted to electrical energy,
and the PMSM serves as a power generator; in addition,
when the three-phase symmetrical current flows into the
stator side, since the three-phase stator has a phase differ-
ence of 120° in terms of spatial position, the current of the
three-phase stator generates a rotating magnetic field in the
space: the rotor is subjected to an electromagnetic force to
move in the rotating magnetic field, when the electrical
energy is converted to kinetic energy, and the PMSM serves
as the motor.

Due to presence of unknown parameters and inputs (B, R,
$T_L$), the current model and the speed model are non-linear
and uncertain, so that a linear system-based PID control
cannot guarantee a high performance. PID is an acronym for
Proportional, Integral, and Differential. As the name sug-
gests, the PID control algorithm is a control algorithm
integrates the three steps of proportion, integral, and Dif-
ferential, which is a technically most mature, most widely
applied control algorithm for a continuous system. This
control algorithm emerged in 1930s~1940s, applicable to a
scenario where the controlled object model is unknown.
Both practical operation experience and theoretical analysis
indicate that, for many industrial processes, satisfactory
results can always be achieved when this control strategy is
applied. PID control is essentially an operation according to
a functional relationship between proportional, integral, and
differential factors based on the error inputted, with the
operation result used for output control. In addition, PID
closed-loop control is a control mechanism that performs
correction based on the output feedback from the controlled
object, where the correction is made to the discrepancies between a measured process variable and the desired set-point according to a set point or criteria. For example, to control the rotating speed of a motor, a sensor for measuring the rotating speed is needed, which feeds back the measurement to the control line. PID is one of the simplest closed-loop control algorithms. PID is the acronym for Proportion, Integral, and Differential, which represent three types of control algorithms, respectively. A combination of the three types of algorithms can effectively correct the error of the controlled object, enabling the controlled object to reach a stable state.

The embodiments of the disclosure obtain complete linearity based on the cascaded control of dynamics, eliminating the need of non-linear dynamic, kinematic models in dynamic inversion control. Firstly, a dynamic inversion control is obtained through equation 1 and equation 2 at time sample:

$$v_d = \frac{di_d}{dt} = \frac{di_d}{dt}\Big|_0 + \frac{1}{L_d}((u_d - u_{d0}) - R(i_d - i_{d0}) + p\omega_m L_q(i_q - i_{q0})) \tag{5}$$

$$v_q = \frac{di_q}{dt} = \frac{di_d}{dt}\Big|_0 + \frac{1}{L_q}((u_q - u_{q0}) - R(i_q - i_{q0}) + p\omega_m L_d(i_d - i_{d0})) \tag{6}$$

In equations (5) and (6), $v_d$ and $v_q$ denote virtual control variables in control:

$$\frac{di_d}{dt}\Big|_0 \quad \text{and} \quad \frac{di_q}{dt}\Big|_0$$

are time derivatives of currents $i_d$ and $i_q$ at the sample point: $u_d$ and $u_q$ are current sample values of the d-axis control output and q-axis control output: $u_{d0}$, $u_{q0}$ are sample values preceding the d-axis control output and q-axis control output, respectively: $i_{q0}$ and $i_{d0}$ are sample values preceding the d-axis current and q-axis current. The incremental dynamic inversion current control may be obtained under a high-speed sampling (10 kHz) condition of all servo motors.

In addition, the current vector transformation control provided in the embodiments of the disclosure is a control strategy and method for high-performance permanent magnet synchronous motor. For example, in a coordinate system M and T rotating with a synchronous angular speed ω1, if M-axis constantly maintains the same direction as the rotor magnetic chain vector, the torque of the asynchronous motor is dictated by the M-axis component i_M1 of the stator current, the rotor magnetic chain of the asynchronous motor is dictated by the T-axis component i_T1 of the stator current: by controlling i_M1 and i_T1, respectively, complete decoupling between torque and magnetic chain control is realized.

$$\Delta u_d = (u_d - u_{d0}) = L_d\left(v_d - \frac{di_d}{dt}\Big|_0\right) \tag{7}$$

$$\Delta u_q = (u_q - u_{q0}) = L_q\left(v_q - \frac{di_q}{dt}\Big|_0\right) \tag{8}$$

This outcome indicates that, the control algorithm obtained by calculating the time derivatives $$\frac{di_d}{dt}\Big|_0 \quad \text{and} \quad \frac{di_q}{dt}\Big|_0$$

of the measured d-axis and q-axis currents $i_d$ and $i_q$ avoids a complex and uncertain (R) current model. The current derivatives, instead of the model, play a role of controller adaptation in the dynamic inversion controller. Due to application of incremental controls $\Delta u_d$ and $\Delta u_q$, the current system is completely linearized, static and decoupled, the dynamic inversion virtual control in $\Delta u_d$ and $\Delta u_q$ may apply constant PID parameters.

$$v_d = K_{Pd}(i_{dd} - i_d) + K_{Id}\int(i_{dd} - i_d)dt + K_{Dd}\frac{d(i_{dd} - i_d)}{dt} \tag{9}$$

$$v_q = K_{Pq}(i_{qd} - i_q) + K_{Iq}\int(i_{qd} - i_q)dt + K_{Dq}\frac{d(i_{qd} - i_q)}{dt} \tag{10}$$

Since the relative degrees of both (1) and (2) are 1, (9) and (10) may be simplified as PI control.

$$v_d = K_{Pd}(i_{dd} - i_d) + K_{Id}\int(i_{dd} - i_d)dt \tag{11}$$

$$v_q = K_{Pq}(i_{qd} - i_q) + K_{Iq}\int(i_{qd} - i_q)dt \tag{12}$$

where $K_{Pd}$, $K_{Id}$ and $K_{Dd}$ are d-axis PID control coefficients: $K_{Pq}$, $K_{Iq}$ and $K_{Dq}$ are q-axis PID control coefficients, and $i_{dd}$ and $i_{qd}$ are desired values of d-axis and q-axis control, respectively, which are given by the rotating-speed control loop.

Embodiments of the disclosure offer the following benefits: 1. eliminating a need of motor model for adaptive control: 2. non-linear control: 3. the control system is insensitive to uncertain system parameters: 4. the control system is insensitive to uncertain external disturbances: 5. the control system guarantees that closed-loop stability and high-performance control are obtained under any practical disturbing load condition: 6. the control algorithm is simple and easily implemented.

The example embodiments described above overcome the technical problems in conventional technologies that motor model identification, particularly online model identification, significantly increases system complexity; the model identification cannot always guarantee correct model and model parameters obtained; and the fuzzy control, sliding mode control, neural network-based control, and model reference adaptation cannot guarantee algorithm stability and stable operation under any operating load interference environment.

The serial numbers of the example embodiments described supra are only for descriptive purposes, not representing priority of modified example embodiments.

The depictions of various example embodiments have different focuses, and some features not detailed in a certain embodiment may refer to relevant depictions in other example embodiments.

In the various example embodiments provided herein, it should be understood that the technical contents disclosed herein may be implemented in other manners. The apparatus examples described supra are only schematic, e.g., partition of the units may be partition by logic functions; in practical implementation, the partition may have alternative partition manners, e.g., a plurality of units or components may be combined or integrated to another system, or some features may be omitted or may not be executed. Additionally, the mutual coupling, or direct coupling, or communication connection between what are displayed or discussed may be via some interfaces; the indirect coupling or communication connection between the units or modules may be in electrical or another form.

The units described as discrete parts may be or may not be physically separated; the parts displayed as units may or may not be physical units, i.e., they may be located at a same place or may be distributed on a plurality of units. Part or all of the units may be selected to achieve the objectives of the solutions of the embodiments of the disclosure according to actual needs.

Additionally, various functional units in the embodiments of the disclosure may be integrated onto one processing unit, or may be physically existent standalone; or, two or more of the embodiments above may be integrated onto one unit. The integrated unit may be implemented in a hardware form or in a software functional unit form.

The integrated unit, if implemented in a software functional unit form and sold or used as a standalone product, may be stored in one computer-readable storage medium. Based on such understanding, the substantive technical solution of the disclosure, or the part contributing to the prior art, or all or part of the technical solution, may be embodied in a form of software product; the computer software product is stored in one storage medium, including a plurality of instructions to cause a computer device (which may be a personal computer, server, or network device) to execute all or part of the method described in various example embodiments of the disclosure. the storage medium includes various mediums that may store program code such as a USB device, a ROM (Read-Only Memory), a RAM (Random Access Memory), a mobile hard disc, a magnetic disc, or an optical disc.

What have been described supra are only preferred example embodiments of the disclosure. It should be noted that, to a person of normal skill in the art, various changes and modifications may also be made without departing from the principle of the disclosure, and such changes and modifications should also be deemed as falling within the protection scope of the disclosure.

The invention claimed is:

1. A method of adaptive current control for an alternating-current AC servo motor, comprising:

acquiring an initial current;

inputting the initial current to a current vector transformation module to generate first target data;

inputting the first target data to a current control loop, and simultaneously taking time derivative of the first target data to generate second target data; and inputting both of the second target data and an output of the current control loop to an incremental dynamic inversion control module, and inputting an output of the incremental dynamic inversion control module to the current vector inverse transformation module, wherein the initial current is an initial three-phase AC motor current, wherein the incremental dynamic inversion control module is expressed as:

$$\Delta u_d = (u_d - u_{d0}) = L_d\left(v_d - \frac{di_d}{dt}\Big|_0\right)$$

$$\Delta u_q = (u_q - u_{q0}) = L_q\left(v_q - \frac{di_q}{dt}\Big|_0\right)$$

where $\Delta u_d$ and $\Delta u_q$ are d-axis control increment and q-axis control increment, $v_d$ and $v_q$ are virtual control variables in control, $$\frac{di_d}{dt}\Big|_0 \text{ and } \frac{di_q}{dt}\Big|_0$$

are time derivatives of current $i_d$ and $i_q$ at a sampling point, $u_d$ and $u_q$ are current sample values of d-axis and q-axis control outputs, $u_{d0}$, $u_{q0}$ are sample values preceding the d-axis and q-axis control outputs, respectively, $L_d$ denotes d-axis inductance, and $L_q$ is q-axis inductance.

2. The method of claim 1, wherein control of the AC servo motor further comprises: rotating speed control loop and rotating angle-position control loop.

3. A non-volatile storage medium, wherein the non-volatile storage medium comprises a program stored, wherein the program, when running, controls a device where the non-volatile storage medium is hosted to perform the method according to claim 1.

4. An electronic device, comprising a processor and a memory, the memory storing a computer-readable instruction, the processor being configured to execute the computer-readable instruction, wherein the computer-readable instruction, when being executed, performs the method according to claim 1.

5. A system of adaptive current control for an alternating-current AC servo motor, comprising:

a sampling module configured to acquire an initial current;

a current vector transformation module configured such that the initial current is inputted to the current vector transformation module to generate first target data;

a current control module configured to input the first target data to a current control loop and simultaneously take time derivative of the first target data to generate second target data; and an incremental dynamic inversion module configured to input both of the second target data and an output of the current control loop to an incremental dynamic inversion control module, and input an output of the incremental dynamic inversion control module to the current vector inverse transformation module, the initial current is an initial three-phase AC motor current;

the incremental dynamic inversion control module is expressed as:

$$\Delta u_d = (u_d - u_{d0}) = L_d\left(v_d - \frac{di_d}{dt}\Big|_0\right)$$

$$\Delta u_q = (u_q - u_{q0}) = L_q\left(v_q - \frac{di_q}{dt}\Big|_0\right)$$

where $\Delta u_d$ and $\Delta u_q$ are d-axis control increment and q-axis control increment, $v_d$ and $v_q$ are virtual control variables in control, $$\frac{di_d}{dt}\Big|_0 \text{ and } \frac{di_q}{dt}\Big|_0$$

are time derivatives of currents $i_d$ and $i_q$ at a sampling point, $u_d$ and $u_q$ are current sample values of d-axis and q-axis control outputs, $u_{d0}$, $u_{q0}$ are sample values preceding the d-axis and q-axis control outputs, respectively, $L_d$ denotes d-axis inductance, and $L_q$ is q-axis inductance.

* * * * *